(12) United States Patent
Park et al.

(10) Patent No.: US 12,482,876 B2
(45) Date of Patent: Nov. 25, 2025

(54) BATTERY PACK AND DEVICE INCLUDING THE SAME

(71) Applicant: LG Energy Solution, Ltd., Seoul (KR)

(72) Inventors: Subin Park, Daejeon (KR); Junyeob Seong, Daejeon (KR); Won Kyoung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 739 days.

(21) Appl. No.: 17/761,708

(22) PCT Filed: Jul. 9, 2021

(86) PCT No.: PCT/KR2021/008807
§ 371 (c)(1),
(2) Date: Mar. 18, 2022

(87) PCT Pub. No.: WO2022/014966
PCT Pub. Date: Jan. 20, 2022

(65) Prior Publication Data
US 2022/0344743 A1  Oct. 27, 2022

(30) Foreign Application Priority Data
Jul. 14, 2020 (KR) .................. 10-2020-0086792

(51) Int. Cl.
*H01M 10/653* (2014.01)
*H01M 10/6551* (2014.01)
(Continued)

(52) U.S. Cl.
CPC ..... *H01M 10/653* (2015.04); *H01M 10/6551* (2015.04); *H01M 10/658* (2015.04); *H01M 50/244* (2021.01); *H01M 50/505* (2021.01)

(58) Field of Classification Search
None
See application file for complete search history.

(56) References Cited

U.S. PATENT DOCUMENTS

| | | | |
|---|---|---|---|
| 2013/0004822 A1 | 1/2013 | Hashimoto et al. | |
| 2017/0125862 A1 | 5/2017 | DeKeuster et al. | |

(Continued)

FOREIGN PATENT DOCUMENTS

| | | | |
|---|---|---|---|
| CN | 102856516 A | 1/2013 | |
| CN | 104956513 A | 9/2015 | |

(Continued)

OTHER PUBLICATIONS

Search Report dated Sep. 12, 2023 from the Office Action for Chinese Application No. 202180005601.X issued Sep. 14, 2023, 3 pages. [See p. 1-2, categorizing the cited references].

(Continued)

*Primary Examiner* — Wyatt P McConnell
(74) *Attorney, Agent, or Firm* — Lerner David LLP

(57) ABSTRACT

A battery pack according to one embodiment of the present disclosure may include a lower pack housing having a plurality of module regions, a thermal conductive resin layer applied to the lower pack housing within the module region, a plurality of battery cell stacks mounted in each of the plurality of module regions on the thermal conductive resin layer, and an upper pack housing for covering the plurality of battery cell stacks.

15 Claims, 9 Drawing Sheets

(51) Int. Cl.
*H01M 10/658* (2014.01)
*H01M 50/244* (2021.01)
*H01M 50/505* (2021.01)

(56) References Cited

U.S. PATENT DOCUMENTS

| | | | |
|---|---|---|---|
| 2017/0373289 | A1 | 12/2017 | Lee et al. |
| 2018/0175468 | A1 | 6/2018 | Shin et al. |
| 2018/0194235 | A1 | 7/2018 | Kim et al. |
| 2018/0316070 | A1 | 11/2018 | Lee et al. |
| 2018/0366794 | A1 | 12/2018 | Kim et al. |
| 2019/0131678 | A1* | 5/2019 | Kim .................. H01M 10/656 |
| 2019/0221904 | A1 | 7/2019 | Fujii |
| 2019/0259987 | A1 | 8/2019 | Tate |
| 2019/0348726 | A1 | 11/2019 | Marpu et al. |
| 2020/0006823 | A1 | 1/2020 | Chung et al. |
| 2020/0144580 | A1 | 5/2020 | Hong et al. |
| 2020/0203784 | A1 | 6/2020 | Shimizu et al. |
| 2020/0259141 | A1 | 8/2020 | Hawwa et al. |
| 2020/0365855 | A1 | 11/2020 | Murayama et al. |
| 2020/0395643 | A1 | 12/2020 | Seo et al. |
| 2021/0057689 | A1 | 2/2021 | Park et al. |
| 2021/0242515 | A1 | 8/2021 | Lee et al. |
| 2023/0187725 | A1 | 6/2023 | Park et al. |

FOREIGN PATENT DOCUMENTS

| | | |
|---|---|---|
| CN | 106898840 A | 6/2017 |
| CN | 107771366 A | 3/2018 |
| CN | 108352475 A | 7/2018 |
| CN | 108475832 A | 8/2018 |
| CN | 110048182 A | 7/2019 |
| CN | 110931673 A | 3/2020 |
| CN | 210296470 U | 4/2020 |
| CN | 111373597 A | 7/2020 |
| JP | 2009146795 A | 7/2009 |
| JP | 6104621 B2 | 3/2017 |
| JP | 2018507512 A | 3/2018 |
| JP | 2018538662 A | 12/2018 |
| JP | 2019500736 A | 1/2019 |
| JP | 2019125449 A | 7/2019 |
| JP | 2019145396 A | 8/2019 |
| JP | 2021504888 A | 2/2021 |
| JP | 2021523550 A | 9/2021 |
| KR | 20060082302 A | 7/2006 |
| KR | 20170019041 A | 2/2017 |
| KR | 20170044472 A | 4/2017 |
| KR | 20170107798 A | 9/2017 |
| KR | 20190071454 A | 6/2019 |
| KR | 20190087307 A | 7/2019 |
| KR | 20190116801 A | 10/2019 |
| KR | 20200003600 A | 1/2020 |
| KR | 20200015207 A | 2/2020 |
| KR | 20200030967 A | 3/2020 |
| WO | 2017104878 A1 | 6/2017 |
| WO | 2019151037 A1 | 8/2019 |
| WO | 2019167689 A1 | 9/2019 |
| WO | 2019235724 A1 | 12/2019 |
| WO | 2020060054 A1 | 3/2020 |
| WO | 2020116825 A1 | 6/2020 |
| WO | 2021261702 A1 | 12/2021 |

OTHER PUBLICATIONS

International Search Report for PCT/KR2021/008807 dated Nov. 9, 2021. 3 pgs.
Extended European Search Report including Written Opinion for Application No. 21842621.1 dated Aug. 19, 24, pp. 1-8.

* cited by examiner

[FIG. 1]
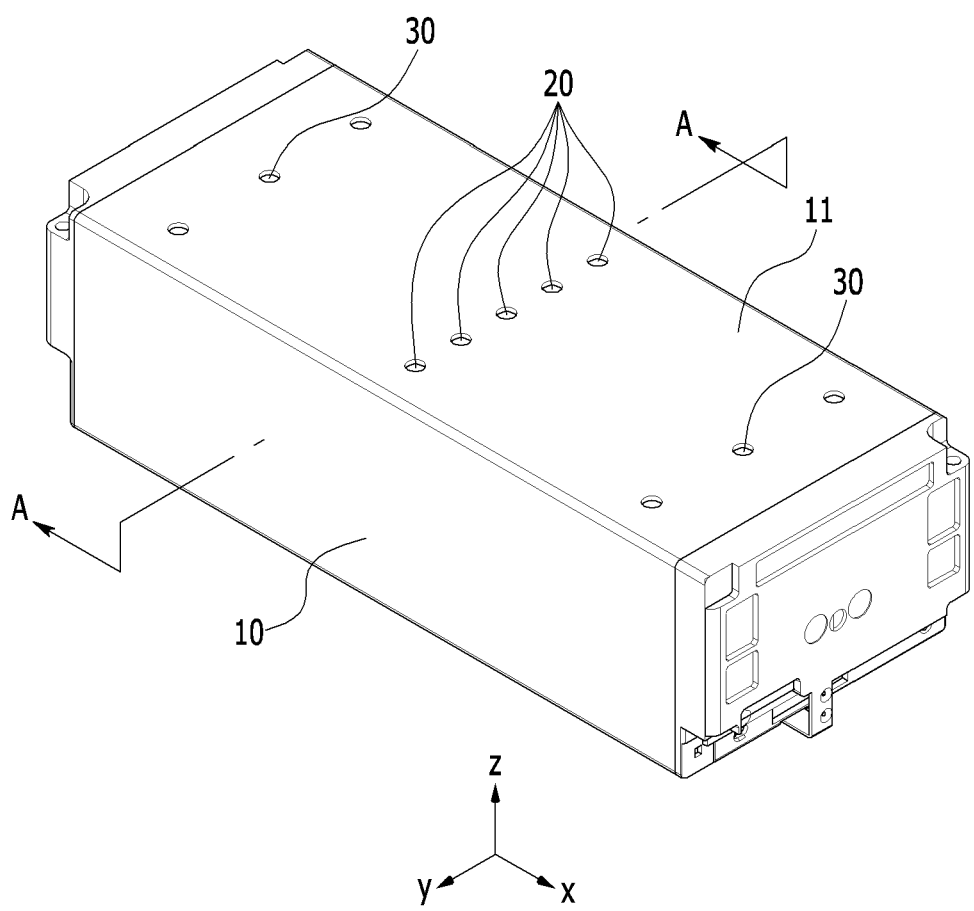

[FIG. 2]
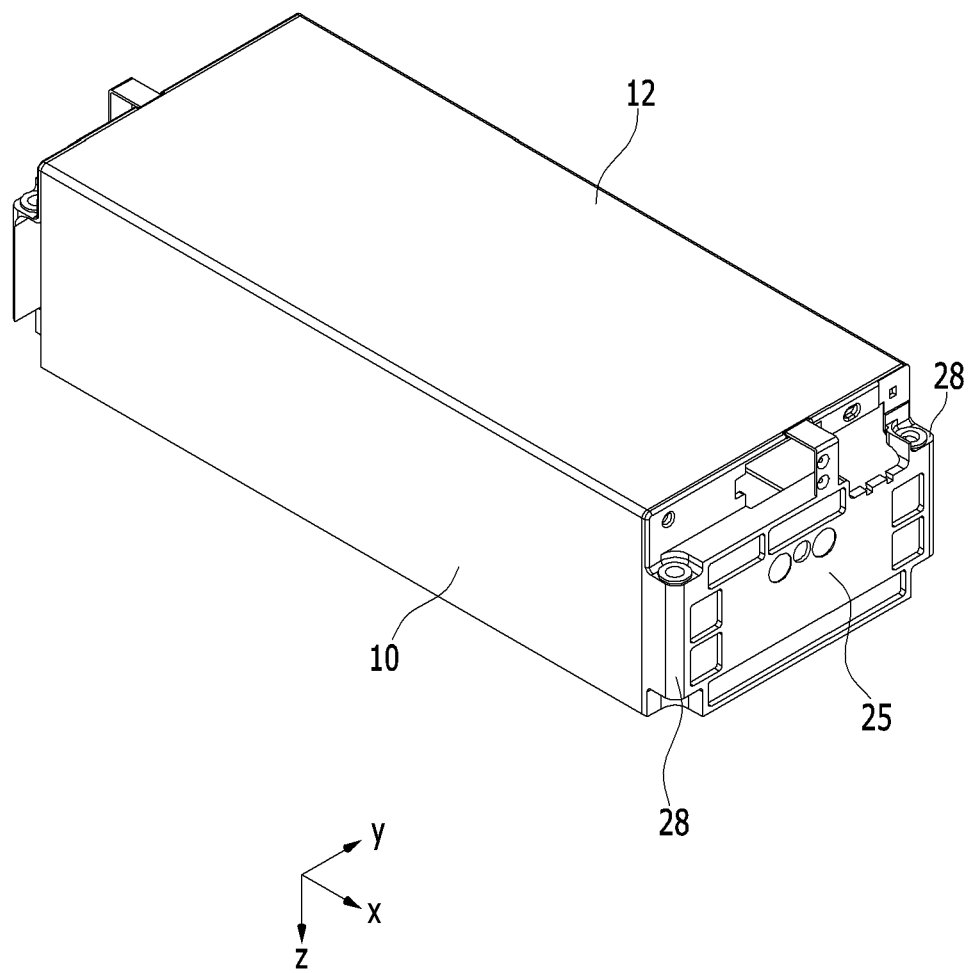

[FIG. 3]
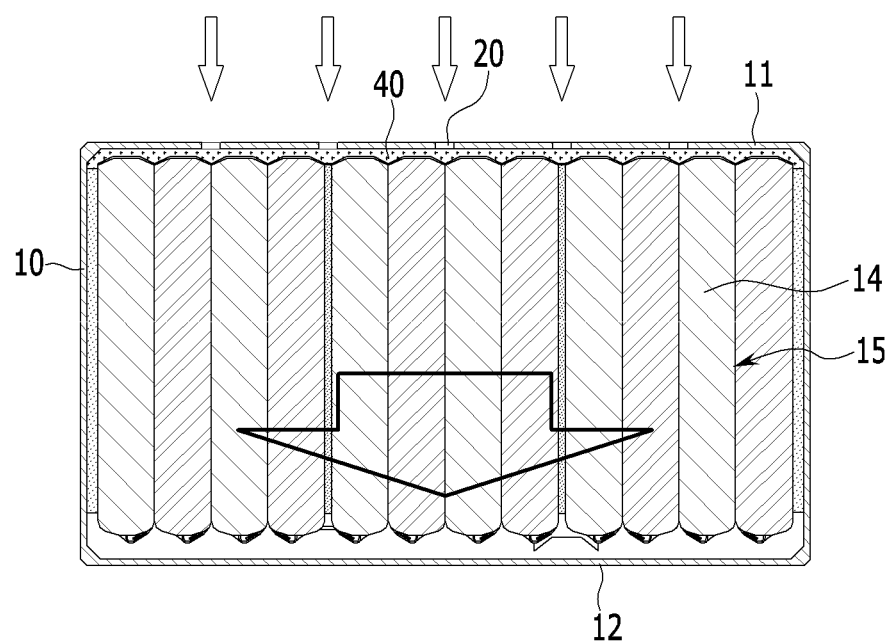

[FIG. 4]
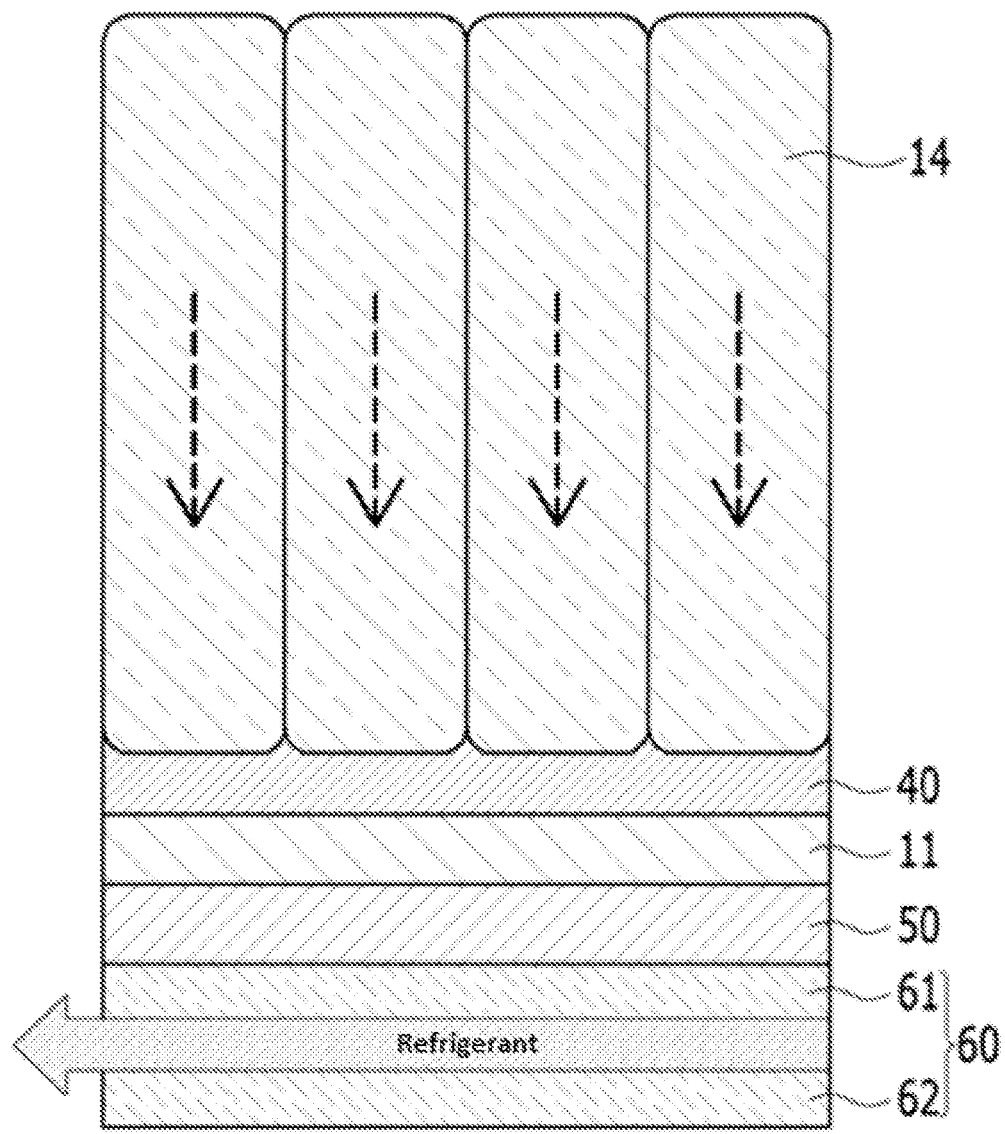

[FIG. 5]
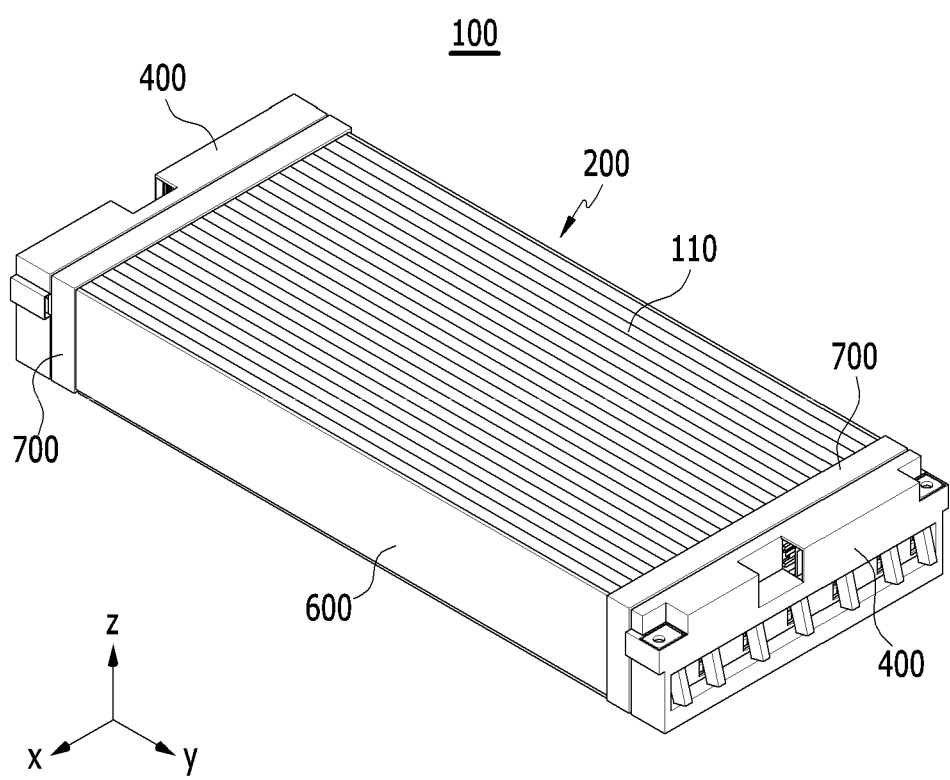

[FIG. 6]
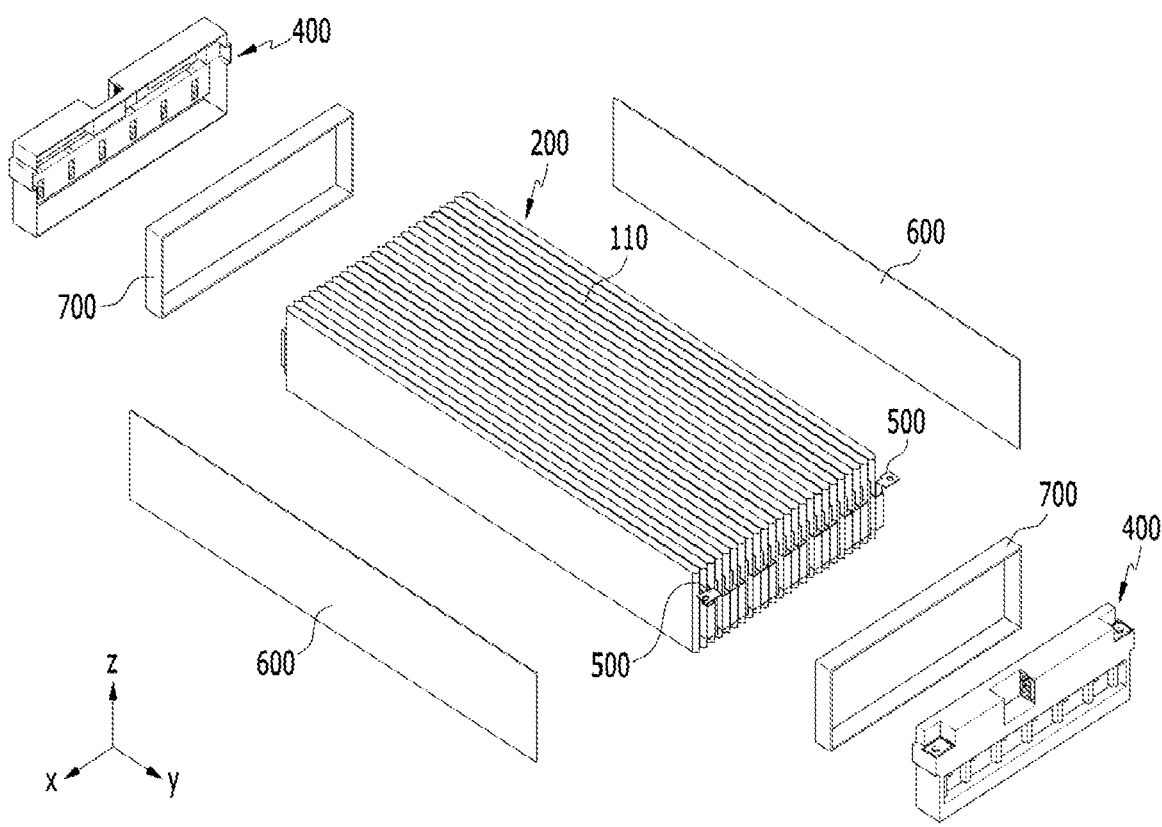

[FIG. 7]
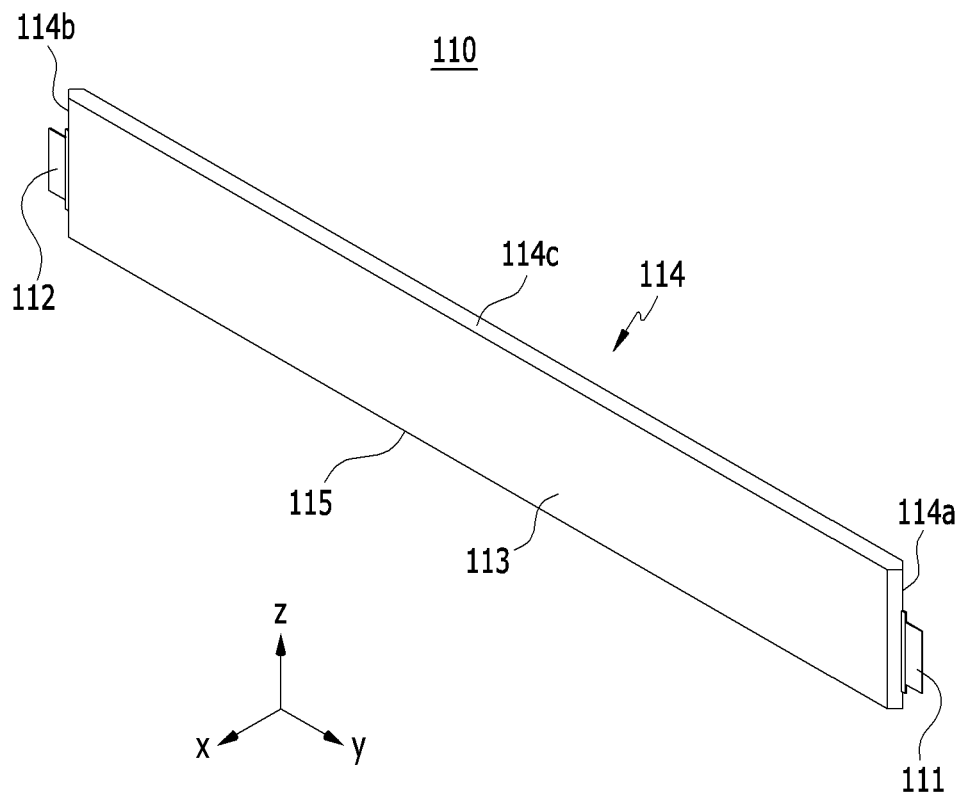
[FIG. 8]
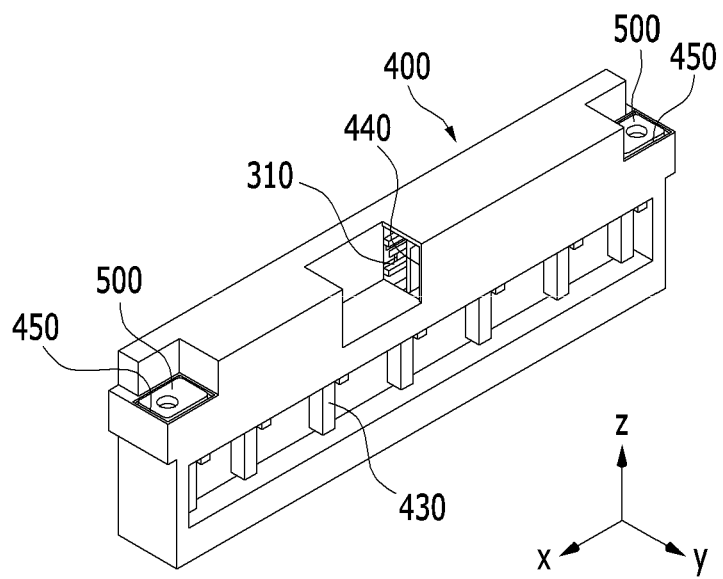

[FIG. 9]
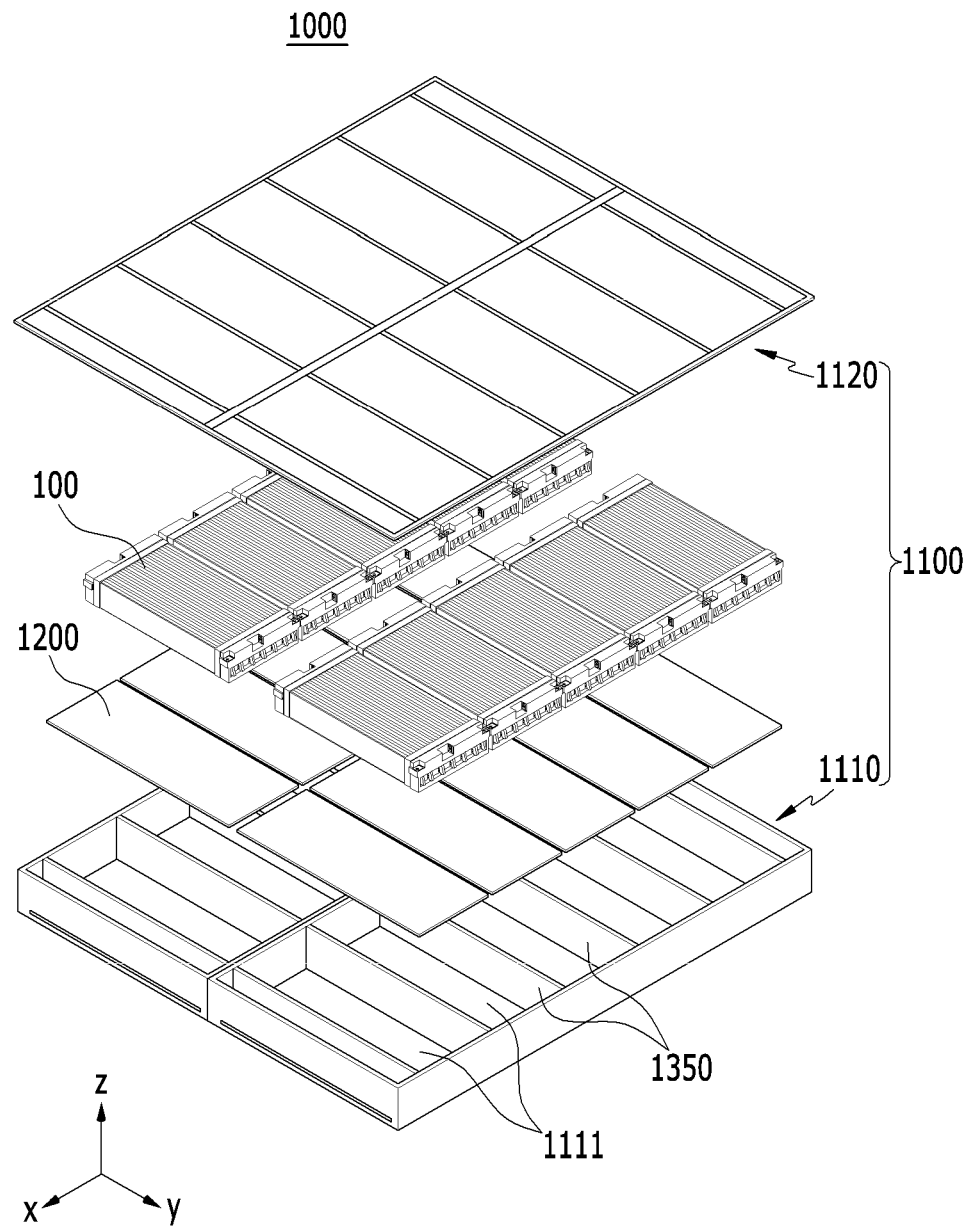

[FIG. 10]
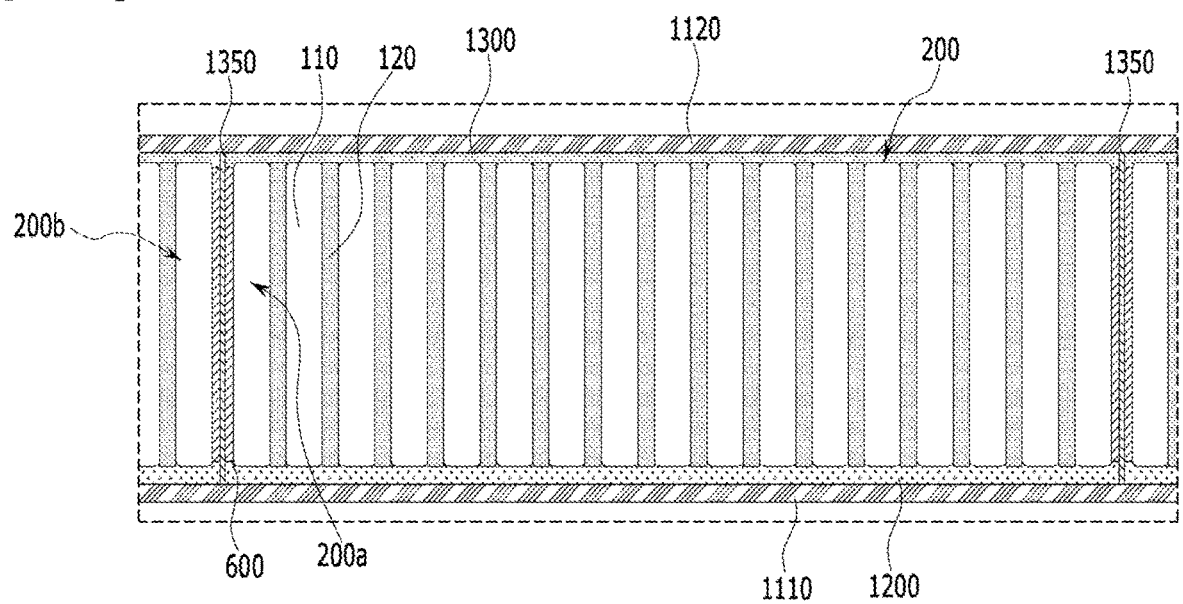

BATTERY PACK AND DEVICE INCLUDING THE SAME

CROSS CITATION WITH RELATED APPLICATION(S)

This application is a national phase entry under 35 U.S.C. § 371 of International Application No. PCT/KR2021/008807 filed on Jul. 9, 2021, which claims the benefit of Korean Patent Application No. 10-2020-0086792 filed on Jul. 14, 2020, with the Korean Intellectual Property Office, the disclosures of which are incorporated herein by reference in their entirety.

TECHNICAL FIELD

The present disclosure relates to a battery pack and a device including the same, and more particularly, to a battery pack with increased productivity and a device including the same.

BACKGROUND ART

With the increase of the technological development and demand for a mobile device, demand for a secondary battery as an energy source is rapidly increasing, and accordingly, many studies reviewing battery technology to meet a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably produced so as to have as small a size and weight as possible. For this reason, a prismatic battery, a pouch-shaped battery or the like, which can be stacked with high integration and have a small weight relative to capacity, are usually used as a battery cell of the middle or large-sized battery module. Meanwhile, in order to protect the battery cell stack from external impact, heat or vibration, the battery module may include a module frame in which a front surface and back surface are opened to house the battery cell stack in an internal space.

FIG. 1 is a perspective view showing a hole formed in a bottom portion of a frame in a conventional battery module. FIG. 2 is a perspective view showing a state in which the battery module of FIG. 1 is reversed upside down. FIG. 3 is a cross-sectional view taken along the cutting line A-A of FIG. 1. FIG. 4 is a diagram showing a state in which the battery module of FIG. 2 is combined with a heat sink.

Referring to FIGS. 1 to 3, in order to protect a battery cell stack 15 from external impact, heat or vibration, the battery module may include a module frame 10 of which a front surface and a back surface are opened so as to house the battery cell stack 15 in an internal space. The module frame 10 has a top portion 12 and a bottom portion 11. Referring to FIG. 1 showing a state in which the battery module of FIG. 2 is reversed upside down, a liquid injection hole 20 may be formed in the bottom portion 11 of the module frame 10.

A thermal conductive resin can be injected between the battery cell stack 15 and the bottom portion 11 of the module frame 10 through the liquid injection hole 20 to form a thermal conductive resin layer 40 as shown in FIG. 3.

The thermal conductive resin layer 40 may transfer heat generated in the battery cell stack 15 to the outside of the battery module. A checking hole 30 is further formed in the bottom portion 11 of the module frame 10. When injecting the thermal conductive resin, the thermal conductive resin injected more than necessary may be discharged to the outside of the battery module via the checking hole 30, thereby confirming the amount of injection.

FIG. 1 shows a state in which the battery module is reversed by 180 degrees in order to inject a thermal conductive resin, wherein as shown in FIG. 3, the components inside the battery module may move downward due to gravity. A battery cell stack 15, which is an aggregate formed by stacking a plurality of battery cells 14, is mounted inside the battery module, and the battery cell stack 15 moves downward due to gravity. Therefore, the space where the thermal conductive resin can be injected is wider than the originally designed space. At this time, the thermal conductive resin is injected, and the amount of the thermal conductive resin that fills the space between the bottom portion 11 and the battery cell stack 15 can be increased more than necessary. Consequently, reverse discharge may occur, or a quality problem of the battery module may occur due to non-curing.

Referring to FIG. 4, the battery module of FIG. 2 can be combined with a heat sink 60 to cool the heat generated in the battery cells 14, thereby forming a battery pack. At this time, the heat sink 60 includes an inlet through which the refrigerant flows in, an outlet through which the refrigerant flows out, a lower plate 62 having a cooling flow path for connecting the inlet and the outlet, and an upper plate 61 for covering the lower plate 62. Here, a heat transfer member 50 may be further formed between the bottom portion 11 of the battery module and the heat sink 60.

The heat generated from the battery cell 14 passes the thermal conductive resin layer 40, the bottom portion 11 of the module frame 10, the heat transfer member 50, and a heat sink 60 located on the lower surface of the bottom portion 11 in this order, and then transferred to the outside of the battery module. However, in such a case, since the heat transfer path becomes complicated, it is difficult to effectively transfer the heat generated from the battery cell 14. The module frame 10 itself may reduce the heat conduction characteristics, and a fine air layer such as an air gap that can be formed between each of the module frame 10, the heat transfer member 50, and the heat sink 60 can also become a factor that deteriorates the heat conduction characteristics.

Further, referring back to FIG. 2, an end plate 25 may be formed so as to cover the front surface (x-axis direction) and the back surface (direction opposite to x-axis) of the battery cell stack 15. The end plate 25 physically protects the battery cell stack 15 and other electrical components from external impact, and the battery module can be fixed to a pack frame by a module mounting structure 28 located at the outermost part of the end plate 25 in a direction parallel to the y-axis, thereby forming a battery pack. Such a module mounting structure 28 requires a fastening member such as a bolt, which may reduce productivity.

DETAILED DESCRIPTION OF THE INVENTION

Technical Problem

It is an object of the present disclosure to provide a battery pack that improves cooling efficiency and productivity by simplifying the production process, and a device including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery pack comprising: a lower pack housing having a plurality of module regions, a thermal conductive resin layer applied to the lower pack housing within the module region, a plurality of battery cell stacks mounted in each of the plurality of module regions on the thermal conductive resin layer, and an upper pack housing for covering the plurality of battery cell stacks.

The plurality of module regions are partitioned by a plurality of partition walls formed in the lower pack housing, and the partition wall may be located between adjacent battery cell stacks among the plurality of battery cell stacks.

The thermal conductive resin layer includes a first thermal conductive resin layer and a second thermal conductive resin layer, the plurality of module regions comprise a first region and a second region partitioned from each other by the partition wall, the first thermal conductive resin layer is formed so as to correspond to the first region, and the second thermal conductive resin layer is formed so as to correspond to the second region.

The first thermal conductive resin layer and the second thermal conductive resin layer may be disposed separately from each other.

The battery pack may include a thermal paste layer applied to the plurality of battery cell stacks.

The thermal paste layer may include an adhesive component that joins the upper pack housing and the battery cell stack.

A first battery cell stack and a second battery cell stack are mounted in each of the first region and the second region of the plurality of module regions, and the height of the partition wall may be higher than a height of the side surface of the first battery cell stack and a height of the side surface of the second battery cell stack.

The battery cell stack includes a plurality of battery cells stacked along a first direction, and the battery cell stack may further include an adhesive member located between battery cells adjacent to each other along the first direction.

The thermal conductive resin layer may include an adhesive component that joins the lower pack housing and the battery cell stack.

The battery pack may further include a heat dissipation layer located between the lower pack housing and the thermal conductive resin layer.

The battery pack further includes electrode leads each protruding from the battery cells included in the battery cell stack, and an insulating cover for covering the front surface and the back surface of the battery cell stack from which the electrode leads protrude, wherein the insulating cover may face the lower pack housing.

A terminal busbar opening is formed in the insulating cover, and the terminal busbar is connected to the outside through the terminal busbar opening, and the terminal busbar opening may be formed at the outermost part of the insulating cover with reference to the stacking direction of the plurality of battery cells included in the battery cell stack.

According to one embodiment of the present disclosure, there is provided a device comprising the above-mentioned battery pack.

Advantageous Effects

According to one embodiment of the present disclosure, the battery cells are assembled directly into the pack housing without a module frame structure, so that heat transfer performance can be improved, and the battery cells are assembled directly into the pack instead of assembling the pack after assembling the module, so that productivity can be improved by simplifying the assembly process.

BRIEF DESCRIPTION OF THE DRAWINGS

FIG. 1 is a bottom perspective view of a frame in a conventional battery module;

FIG. 2 is a top perspective view of the battery module of FIG. 1;

FIG. 3 is a cross-sectional view taken along a line A-A of FIG. 1;

FIG. 4 is a schematic diagram of the battery module of FIG. 2 with a heat sink;

FIG. 5 is a perspective view of a battery module according to an embodiment of the present disclosure;

FIG. 6 is an exploded perspective view of the battery module of FIG. 5;

FIG. 7 is a perspective view of a battery cell of the battery module of FIG. 5;

FIG. 8 is a perspective view of an insulating cover of the battery module of FIG. 5;

FIG. 9 is an exploded perspective view of a battery pack according to another embodiment of the present disclosure; and FIG. 10 is a cross-sectional view taken along an x-axis direction of the battery pack of FIG. 9.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 5 is a perspective view of a battery module according to one embodiment of the present disclosure. FIG. 6 is an exploded perspective view of the battery module of FIG. 5. FIG. 7 is a perspective view of a battery cell included in the battery module of FIG. 5.

Referring to FIGS. 5 to 7, a battery module 100 according to one embodiment of the present disclosure includes a battery cell stack 200 in which a plurality of battery cells 110 are stacked.

First, the battery cell 110 is preferably a pouch-type battery cell, and may be formed into a rectangular sheet-like structure. For example, the battery cell 110 according to this embodiment includes two electrode leads 111 and 112, and the electrode leads 111 and 112 are directed in reverse directions with reference to the cell body 113. The electrode leads 111 and 112 have a structure in which the electrode leads 111 and 112 each protrude from one end 114a and the other end 114b of the cell body 113. More specifically, the electrode leads 111 and 112 are connected to an electrode assembly (not shown) and protrude from the electrode assembly (not shown) to the outside of the battery cell 110. One of the two electrode leads 111 and 112 may be a positive electrode lead 111 and the other may be the negative electrode lead 112. That is, the positive electrode lead 111 and the negative electrode lead 112 can be projected so as to face in opposite directions with reference to one battery cell 110.

Meanwhile, the battery cell 110 can be produced by joining both ends 114a and 114b of the cell case 114 and one side part 114c connecting them in a state in which an electrode assembly (not shown) is housed in a cell case 114. In other words, the battery cell 110 according to this embodiment has a total of three sealing portions, the sealing portion has a structure in which it is sealed by a method such as heat fusion, and the other side part may be composed of a connection part 115. The cell case 114 may be composed of a laminate sheet including a resin layer and a metal layer.

Such battery cells 110 may be formed in plural numbers, and the plurality of battery cells 110 are stacked so as to be electrically connected to each other, thereby forming a battery cell stack 200. In particular, as shown in FIG. 7, the plurality of battery cells 110 may be stacked along the x-axis direction which is the first direction. Therefore, the electrode leads 111 and 112 can be protruded in the y-axis direction and the -y-axis direction, respectively.

Meanwhile, the battery module 100 according to the embodiment of the present disclosure forms a module-less structure in which the module frame and the end plate made of a metal material are removed, unlike the conventional battery module described with reference to FIGS. 1 to 4. Instead of the module frame, the battery module 100 according to this embodiment may include a side face plate 600 and a holding band 700. As the module frame and the end plate are removed, complicated processes that require precise control, such as the process of housing the battery cell stack 200 inside the module frame, or the process of assembling module frames and end plates, is not necessary. Further, there is an advantage that the weight of the battery module 100 can be significantly reduced only by the removed module frame and end plate. Further, the battery module 100 according to the present embodiment may have an advantage that re-workability is advantageous in the battery pack assembly process due to the removal of the module frame. In contrast, the conventional battery module could not be reworked even if a defect occurs due to the welding structure of the module frame.

The side face plate 600 is a plate-shaped member and can be disposed on both side surfaces of the battery cell stack 200 to supplement the rigidity of the battery module 100. Such side face plate 600 has elastic properties and may include a plastic material manufactured by injection molding, and in some cases, a leaf spring material can be applied.

A holding band 700 is a member that wraps the battery cell stack 200 at both end parts of the battery cell stack 200, and can has a function of fixing the plurality of battery cells 110 and the side face plates 600 constituting the battery cell stack 200. After fixing the battery cell stack 200 and the side face plate 600 via the holding band 700 in this way, an insulating cover 400 can be disposed on the front surface and the back surface of the battery cell stack 200 corresponding to the direction in which the electrode leads 111 and 112 protrude. Such a holding band 700 can be composed of a material having a predetermined elastic force, and specifically, a structure of a leaf spring can be applied.

FIG. 8 is a perspective view showing an insulating cover included in the battery module of FIG. 5.

Referring to FIGS. 6 and 8, the battery module 100 according to the present embodiment may include an insulating cover 400 that covers the front surface and the back surface of the battery cell stack 200 in which the electrode leads 111 and 112 protrude. Such an insulating cover 400 may include an electrically insulated material and, for example, may include a plastic material, a polymeric material, or a composite material. Further, the insulating cover 400 can be formed in a kind of basket shape so as to cover the front surface and the back surface of the battery cell stack 200.

As described above, in the battery module 100 according to the present embodiment, the end plate and the busbar frame can be removed, and instead an insulating cover 400 can be provided. On the other hand, the electrode leads of the battery cells 110 located outside the battery cell stack 200 may be electrically connected to a terminal busbar 500. Unlike conventional battery modules in which electrode leads are connected to each other via a busbar, the electrode leads 111 and 112 according to the present embodiment are directly joined to each other, a part of which is electrically connected to the terminal busbar 500, thereby forming an HV (High Voltage) connection. Therefore, in the HV connection structure according to the present embodiment, the busbar and the busbar frame on which the busbar is mounted can be removed. Here, the HV connection is for playing the role of a power source for supplying electric power, and means for connection between battery cells and a connection between battery modules.

On the other hand, the insulating cover 400 according to the present embodiment can guide an external connection between the LV connector 310 and the terminal busbar 500 instead of the configuration of the end plate or the like made of a metal material. Specifically, the insulating cover 400 can be formed with a connector opening 440 for guiding the external connection of the LV connector 310, that is, the LV (Low Voltage) connection, and an external connection of the terminal busbar 500, that is, a terminal busbar opening 450 for guiding the HV connection can be formed. Here, the LV connection means a sensing connection for sensing and controlling the voltage of the battery cell.

The insulating cover 400 can ensure insulation properties by blocking contact with an external conductive object at the time of LV connection and HV connection. Further, in the HV connection process, bolts and nuts can be fastened through the through holes formed in the terminal busbar 500. The terminal busbar opening 450 formed in the insulating cover 400 can function as a kind of guide in which bolts and nuts can be fastened correctly.

The terminal busbar opening 450 according to the present embodiment may be located at the outermost part of the insulating cover 400 with reference to the stacking direction of the plurality of battery cells 110 included in the battery cell stack 200. Conventionally, since the module mounting structure for connecting to the pack frame is formed on the outermost part of the insulating cover or the end plate made of metal material, there was a restriction on the formation position of the terminal busbar opening 450. However, according to the present embodiment, the battery cell stack 200 can be fixed by the thermal conductive resin layer applied to the bottom portion of the lower pack housing as described later, instead of the module mounting structure. Therefore, by eliminating the module mounting structure, the terminal busbar opening 450 can be formed at the outermost part of the insulating cover 400.

FIG. 9 is an exploded perspective view of a battery pack according to another embodiment of the present disclosure.

Referring to FIG. 9, a battery pack 1000 according to one embodiment of the present disclosure may include a battery module 100, a pack frame 1100 for housing the battery module 100, and a thermal conductive resin layer 1200 located between the battery module 100 and the bottom portion 1111 of the pack frame 1100.

First, the battery module 100 includes an insulating cover as described above, and instead may form a module-less structure in which the module frame and the end plate are removed. A plurality of such battery modules 100 may be housed in the pack frame 1100 to form the battery pack 1000.

The pack frame 1100 may include a lower pack housing 1110 and an upper pack housing 1120 that covers the lower pack housing 1110, and a plurality of battery modules 100 may be disposed on the bottom portion 1111 of the lower pack housing 1110. The lower pack housing 1110 has a plurality of module regions, and the plurality of module regions may be partitioned by a plurality of partition walls 1350 formed in the lower pack housing 1110. The partition wall 1350 is formed between battery modules 100 adjacent to each other among the plurality of battery modules 100. For example, the thermal conductive resin layer 1200 includes a first thermal conductive resin layer and a second thermal conductive resin layer adjacent to each other, the plurality of module regions include a first region and a second region partitioned from each other by a partition wall 1350, the first thermal conductive resin layer is formed so as to correspond to the first region, and the second thermal conductive resin layer may be formed so as to correspond to the second region. At this time, the first thermal conductive resin layer and the second thermal conductive resin layer may be disposed separately from each other by the partition wall 1350.

Meanwhile, the thermal conductive resin layer 1200 may be formed by applying a thermal conductive resin to the bottom portion 1111 of the lower pack housing 1110. The thermal conductive resin may include a thermal conductive adhesive material, and specifically, may include at least one of a silicone material, a urethane material, and an acrylic material. The thermal conductive resin is a liquid during application but is cured after application, so that it can perform the role of fixing the battery module 100 to the lower pack housing 1110. Further, since the thermal conductive resin has excellent heat transfer properties, heat generated from the battery cell 110 can be quickly transferred to the bottom portion 1111, thereby preventing overheating of the battery pack 1000. In the battery module 100 according to this embodiment, because the module frame is eliminated, the lower surface of the battery cell stack 200 of FIG. 6 can be directly mounted on the thermal conductive resin layer 1200 applied to the lower pack housing 1110. A lower surface of the battery cell stack 200 may come into contact with the thermal conductive resin layer 1200. At this time, the battery cell stack 200 may be fixed to the lower pack housing 1110 by the thermal conductive resin layer 1200 having adhesive performance. When a separate member or layer is not added between the lower pack housing 1110 and the thermal conductive resin layer 1200, the lower pack housing 1110 may come into contact with the thermal conductive resin layer 1200.

As shown in FIG. 5, in the battery module 100 according to the present embodiment, a part of the battery cell 110 may be exposed to the outside in the module-less structure in which the module frame is removed, and it is essential to fix the exposed battery cell 110 for structural stability. Therefore, the battery pack 1000 according to the present embodiment can form a thermal conductive resin layer capable of fixing the battery module 100, particularly, each battery cell 110 constituting the battery module 100, to the bottom portion 1111, thereby improving structural stability. Further, by eliminating the module frame, the heat generated from the battery cells can be directly transferred from the thermal conductive resin layer to the pack frame, thereby improving cooling efficiency. Although not shown, a heat sink structure may be formed on the pack frame.

FIG. 10 shows a part of a cross-sectional view taken along the x-axis direction of FIG. 9 in the xz plane.

FIG. 10 shows a battery pack according to another embodiment of the present disclosure, and the battery pack 1000 according to the present embodiment may further include a thermal paste layer 1300 applied onto the plurality of battery cell stacks 200. The thermal paste layer 1300 may include an adhesive component for joining the upper pack housing 1120 and the battery cell stack 200. The upper surface of the battery cell stack 200 can come into contact with the thermal paste layer 1300. If a separate member or layer is not added to the lower portion of the upper pack housing 1120, the upper pack housing 1120 may come into contact with the thermal paste layer 1300. In this case, the fixing force of the battery module according to the present embodiment corresponding to the module-less structure can be further improved.

According to this embodiment, the side face plate 600 may be formed between the battery module 100 and the partition wall 1350. The side face plate 600 may face the side surface of the outermost battery cell 110 of the battery cell stack 200. The side face plate 600 may be attached to at least one of the side surfaces of the outermost battery cell 110 of the battery cell stack 200 and the partition wall 1350.

A partition wall 1350 may be disposed between a first battery cell stack mounted in the first region among the plurality of module regions and a second battery cell stack mounted in the second region. In this case, the height of the partition wall 1350 may be higher than the height of the side surface of the first battery cell stack 200a and the height of the side surface of the second battery cell stack 200b. Due to such height difference, the thermal paste can be applied to a desired portion on the upper portion of the battery cell stack 200 to form a thermal paste layer 1300, thereby enhancing adhesive force.

In addition, the battery cell stack 200 may further include an adhesive member 120 located between battery cells 110 adjacent to each other. The fixing force of the battery cell stack 200, which may be weakened with elimination of the module frame, may be enhanced by the adhesive member 120. Although not shown, the battery pack according to the present embodiment may further include a heat dissipation layer located between the lower pack housing 1110 and the thermal conductive resin layer 1200.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be made by those skilled in the art, which falls within the spirit and scope of the principles of the invention described in the appended claims.

DESCRIPTION OF REFERENCE NUMERALS

100: battery module
200: battery cell stack
400: insulating cover
450: busbar opening
700: holding band
1100: pack frame
1110: lower pack housing
1120: upper pack housing

The invention claimed is:

1. A battery pack comprising:
a lower pack housing having a plurality of module regions,
a thermal conductive resin layer disposed within each of the plurality of module regions, the thermal conductive resin layer contacting a surface of each of the plurality of module regions,
a plurality of battery cell stacks mounted in each of the plurality of module regions, the plurality of battery cell stacks contacting the thermal conductive resin layer, and
an upper pack housing configured to cover the plurality of battery cell stacks.

2. The battery pack of claim 1, wherein the plurality of module regions are partitioned by a plurality of partition walls of the lower pack housing, each partition wall being located between adjacent battery cell stacks.

3. The battery pack of claim 1, wherein the thermal conductive resin layer comprises a first thermal conductive resin layer and a second thermal conductive resin layer, each of the plurality of module regions including a first region and a second region partitioned from each other by a partition wall, the first thermal conductive resin layer being disposed in the first region, and the second thermal conductive resin layer being disposed in the second region.

4. The battery pack of claim 3, wherein the first thermal conductive resin layer and the second thermal conductive resin layer do not contact each other.

5. The battery pack of claim 3, further including a thermal paste layer disposed on the plurality of battery cell stacks.

6. The battery pack of claim 5, wherein the thermal paste layer comprises an adhesive component that joins the upper pack housing and the battery cell stack.

7. The battery pack of claim 6, wherein the plurality of battery cell stacks include a first battery cell stack and a second battery cell stack, the first and second battery cell stacks being mounted in each of the first region and the second region of the plurality of module regions, a height of the partition wall being higher than a height of a side surface of the first battery cell stack and a height of a side surface of the second battery cell stack.

8. The battery pack of claim 1, wherein the plurality of battery cell stacks are stacked along a first direction, the plurality of battery cell stacks including an adhesive member located between battery cells adjacent to each other along the first direction.

9. The battery pack of claim 1, wherein the thermal conductive resin layer comprises an adhesive component that joins the lower pack housing and the plurality of battery cell stacks.

10. The battery pack of claim 9, further including a heat dissipation layer located between the lower pack housing and the thermal conductive resin layer.

11. The battery pack of claim 1, further comprising:
one or more electrode leads, each electrode lead protruding from a battery cell of the plurality of battery cell stacks, and
an insulating cover for covering a front surface and a back surface of the plurality of battery cell stacks from which the electrode leads protrude,
wherein the insulating cover faces the lower pack housing.

12. The battery pack of claim 11, wherein the insulating cover includes a terminal busbar opening, a terminal busbar extending through the terminal busbar opening, the terminal busbar opening being formed at an outer part of the insulating cover with reference to a stacking direction of the plurality of battery cells included in the battery cell stack.

13. A device comprising the battery pack of claim 1.

14. A battery pack comprising:
a lower pack housing having a plurality of module regions,
a thermal conductive resin layer disposed within each of the plurality of module regions,
a plurality of battery cell stacks mounted in each of the plurality of module regions, the plurality of battery cell stacks contacting the thermal conductive resin layer, and
an upper pack housing configured to cover the plurality of battery cell stacks,
wherein the plurality of battery cell stacks are stacked along a first direction, the plurality of battery cell stacks including an adhesive member located between battery cells adjacent to each other along the first direction.

15. A battery pack comprising:
a lower pack housing having a plurality of module regions,
a thermal conductive resin layer disposed within each of the plurality of module regions,
a plurality of battery cell stacks mounted in each of the plurality of module regions, the plurality of battery cell stacks contacting the thermal conductive resin layer, and
an upper pack housing configured to cover the plurality of battery cell stacks, the battery pack further comprising:
one or more electrode leads, each electrode lead protruding from a battery cell of the plurality of battery cell stacks, and
an insulating cover for covering a front surface and a back surface of the plurality of battery cell stacks from which the electrode leads protrude,
wherein the insulating cover faces the lower pack housing,
wherein the insulating cover includes a terminal busbar opening, a terminal busbar extending through the terminal busbar opening, the terminal busbar opening being formed at an outer part of the insulating cover with reference to a stacking direction of the plurality of battery cells included in the battery cell stack.

* * * * *